United States Patent [19]

Treichler

[11] 3,707,878
[45] Jan. 2, 1973

[54] PRESSURE BALANCED TUBE ASSEMBLY

[75] Inventor: Ernest Treichler, Santa Ana, Calif.

[73] Assignee: Parker-Hannifin Corporation, Cleveland, Ohio

[22] Filed: Dec. 21, 1970

[21] Appl. No.: 99,734

[52] U.S. Cl..............92/164, 285/DIG. 1, 285/190, 285/231
[51] Int. Cl..............................................F01b 31/00
[58] Field of Search...285/95, 190, DIG. 1, 223, 231, 285/233; 92/119, 163, 164

[56] References Cited

UNITED STATES PATENTS

| 2,790,426 | 4/1957 | Mueller | 92/119 |
| 3,594,019 | 7/1971 | Gotschall | 285/190 |
| 3,001,804 | 9/1961 | Tomlinson | 285/368 |
| 2,845,282 | 7/1958 | Mueller | 285/190 |

*Primary Examiner*—Edgar W. Geoghegan
*Assistant Examiner*—R. H. Lazarus
*Attorney*—Oberlin, Maky, Donnelly & Renner

[57] ABSTRACT

A pressure balanced tube assembly characterized in that the tube thereof has end portions in telescoped sealed relation with spaced apart coupling members, the assembly being such that fluid pressure therein does not impose an axial separating force on the coupling members. The tube assembly is further characterized in that the tube end portions remain sealed in the coupling members despite departure of the spaced location of the coupling members, due to tolerance variations, from predetermined relation with respect to each other both axially and laterally.

15 Claims, 3 Drawing Figures

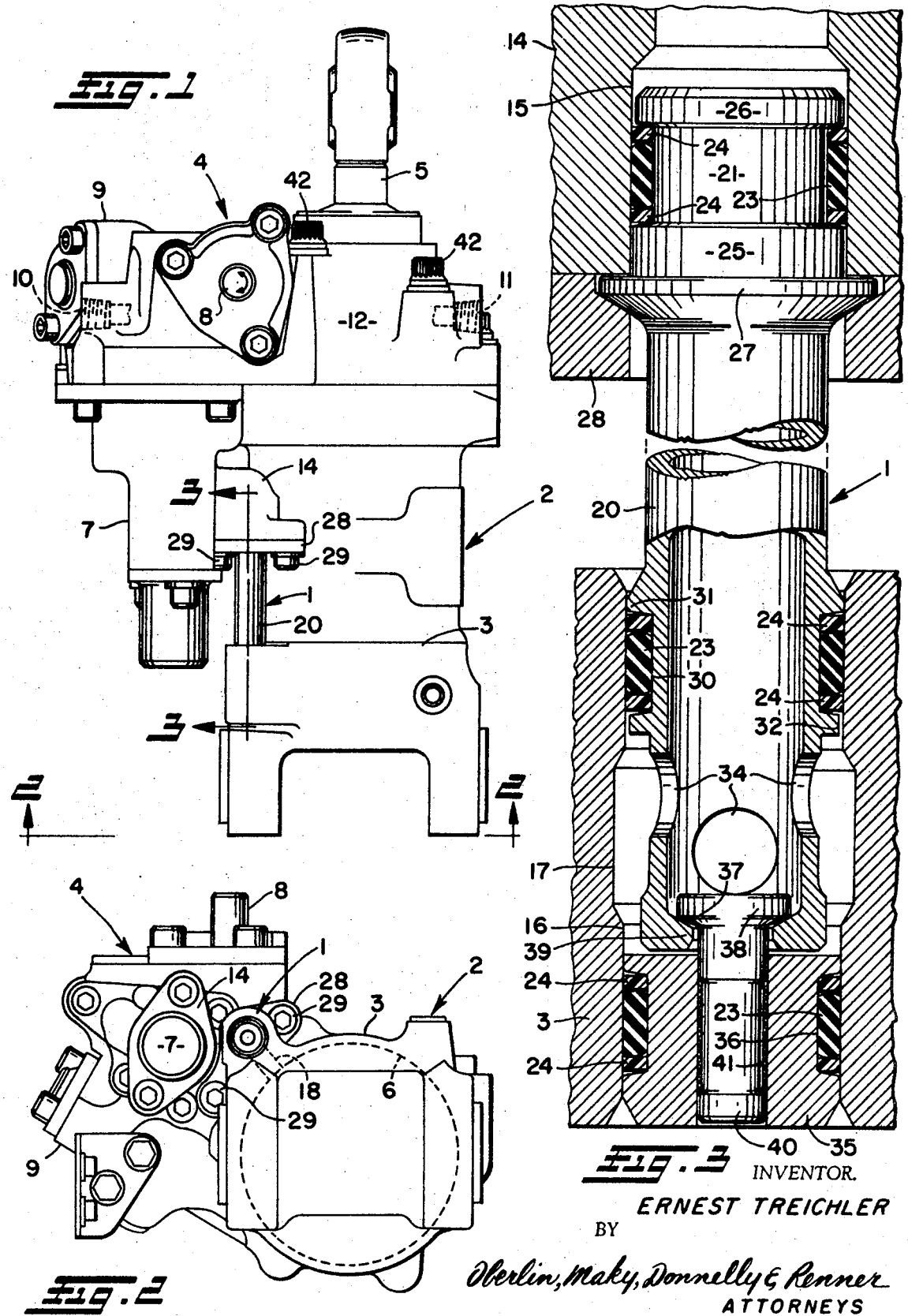

PRESSURE BALANCED TUBE ASSEMBLY

BACKGROUND OF THE INVENTION

It is known to provide a fluid motor such as a double-acting hydraulic cylinder with ports at one end or with a control valve assembly at one end having pressure inlet and return ports and, in either case, a tube extends alongside the cylinder to conduct fluid into and from the other end of the cylinder. In one known form of fluid motor the tube ends are telescoped into and sealed as by packing rings in aligned bores in the respective cylinder heads. In another known form of fluid motor, one end of the tube may have screw threaded engagement with one of the cylinder heads while the other end is telescoped into and sealed in the other cylinder head. Where both tube ends are telescoped into and sealed in bores in the respective cylinder heads, the tube itself is pressure balanced but the cylinder heads are subjected to eccentric load by fluid pressure tending to separate the cylinder heads. This is also true in the case where one end of the tube has screw threaded engagement with a cylinder head because fluid under pressure in the assembly will still tend to force the cylinder heads axially away from each other thus to impose eccentric load thereon.

Moreover, when the tube receiving bores in the respective cylinder heads are misaligned due to tolerance variations in the manufacture of the parts, difficulty may be encountered in obtaining fluid tight seals between the tube end portions and the bores and such misalignment may impose severe bending stresses in the tube with possibility of early fatigue failure due to vibration or fluid pressure pulses.

SUMMARY OF THE INVENTION

In contradistinction to known tube assemblies as used in conjunction with fluid motors and the like, the tube assembly herein is pressure balanced so that the coupling members i.e., the cylinder heads at the ends of the tube are not subjected to axial separating force due to fluid pressure in the assembly and thus eccentric loading on the coupling members is avoided as when the coupling members are associated with the cylinder heads of a fluid motor as aforesaid.

It is another object of this invention to provide a pressure balanced tube assembly of the character indicated in which the coupling members may depart, due to tolerance variations, from predetermined relation to each other without causing bending stresses in the tube and without creating a fluid leakage or packing ring extrusion problem between the tube end portions and the coupling members.

BRIEF DESCRIPTION OF THE DRAWING

FIG. 1 is a side elevation view of a fluid motor assembly which utilizes the present pressure balanced tube assembly;

FIG. 2 is an end elevation view as viewed upwardly along the line 2—2, FIG. 1; and FIG. 3 is an enlarged cross section view of the pressure balanced tube assembly, such cross section having been taken substantially along the line 3—3, FIG. 1.

DETAILED DESCRIPTION OF THE DRAWING

The pressure balanced tube assembly 5 having constituting the present invention is herein shown by way of example as a part of a double acting fluid motor 2 to conduct fluid into and from the head end of the cylinder 3. The rod end of the cylinder 3 has bolted or otherwise secured thereto a manifold or cylinder head assembly 4 which provides a packing for the piston rod having a piston (not shown) which is reciprocable in the cylinder bore 6. The cylinder head assembly 4 has a control valve 7 secured thereto which in the case of a double acting fluid motor 2 may be a spool type four-way reversing valve in which the spool is moved to operating positions as by means of the oscillatable valve operating shaft 8. The cylinder head assembly 4 may also contain for example a thermal relief valve (not shown), and a piston actuated check valve 9. Said assembly 4 also has a pressure inlet port 10 and a return port 11 and, as well known in the art, passages will be provided in the reversing valve 7 and in the housing 12 whereby fluid under pressure may be conducted ether to the rod end or to the head end of the fluid motor 2 via the reversing valve 7 while fluid displaced from the other end of the fluid motor will be conducted to the return port 11 via the reversing valve 7.

Referring now in detail to FIG. 3, the reversing valve housing 14 has a bore 15 which is axially spaced from and aligned with the bore 16 at the head end of the cylinder 3, the bore 16 being enlarged as at 17 and communicated with the interior of the cylinder 3 via the radial passage 18 which intersects the cylinder bore 6 and the aforesaid enlarged portion 17 of the motor port 16.

The tube 20 which intercommunicates said bores 15 and 16 with each other has a packing groove 21 adjacent its upper end in which is disposed a packing ring 23, e.g., an O-ring, and extrusion backup rings 24. The portion 25 of the tube 20 has the usual slight clearance fit with the bore 15 and the portion 26 has a larger clearance fit with the bore 15. For example, the portion 26 may be of say 0.010 to 0.013 inch smaller diameter than the portion 25 for a reason which will appear hereinafter.

To avoid O-ring 23 extrusion under pressure the recommended diametral clearance between portion 25 and bore 15 varies according to the magnitude of the fluid pressure, the cross-section diameter of the O-ring, and the hardness of the O-ring. For example, with a fluid pressure of 3,000 p.s.i., the diametral clearance for an O-ring of 80 Shore A Durometer hardness and of cross-section diameter from 0.070 to 0.275 inch should be from about 0.002 to 0.005 inch while for the same pressure and O-ring sizes except of 90 Shore A Durometer hardness, the diametral clearance may be opened up to about 0.005 to 0.008 inch. Larger clearances may be used for O-rings having backup rings but herein it is preferred to maintain recommended clearances so as to prevent failure of the O-ring 23 even when the backup rings 24 are omitted.

Adjacent the portion 25, the tube 20 is provided with a collar 27 having a conical or spherical face which is radially overlapped by a corresponding face of a retaining flange 28 which is secured to the valve housing 14 as by means of the screws 29. Preferably, when the retaining flange 28 is engaged with the valve housing 14 there will be a slight axial and radial clearance at the collar 27 to enable slight tilting of the tube 20 with respect to the axis of the bore 15.

The lower end portion of the tube 20 has a peripheral groove 30 in which is received another packing ring 23 and adjacent extrusion backup rings 24 and as in the case of the upper end portion of the tube 20, the portion 31 has the usual slight clearance fit in the bore 16 while the portion 32 has a larger clearance fit in the bore 16 which as aforesaid may be say 0.010 to 0.013 inch smaller diameter than the portion 31. Downwardly adjacent the portion 32, the tube 20 has radial holes 34 opening into the enlarged portion 17 of the bore 16. The lower end of the tube 20 is closed by a plug member 35 having a peripheral groove 36 in which are disposed yet another packing ring 23 and extrusion backup rings 24, the plug member 35 making sealed engagement with the portion of the bore 16 below the enlarged portion 17 and having a universal pivot connection 37 with the lower end of the tube 20 through the head 38 of the plug member 35 engaging the inturned flange 39 at the lower end of the tube 20, the part 40 containing the head 38 being brazed at 41 to form the unitary plug member 35. The clearance between flange 39 and part 40 exceeds that between portion 32 and bore 16 to permit greater lateral movement of flange 39 when tube 20 is tilted in bore 16.

When the cylinder head assembly 4 is secured to the upper end of the cylinder 3 as by several screws 42, two of which are shown in FIG. 1, the bores 15 and 16 may be slightly misaligned circumferentially and/or radially and except for the present tube assembly 1, the tube ends would have to be bent or subject to bending strains. In the present case, the short axial length of the portions 25 and 31 which have the usual slight clearance fit with the bores 15 and 16 enables tilting of the tube 20 with respect to the misaligned bores 15 and 16, such tilting within the limits of the usual slight clearance being permitted by the larger clearance portions 26 and 32. When the tube 20 is in tilted position by reason of such misalignment of the bores 15 and 16, the lower end of the tube shifts laterally with respect to the plug member 35 as permitted by the universal pivot connection 37 and the clearance within flange 39.

With reference to the pressure balanced features of the present invention, the fluid seals 23 at the lower end of the tube 20 are preferably on equal diameters of bore 16 whereby fluid under pressure in the tube assembly 1 does not tend to blow the tube 20 out of the bore 16 nor is there any axial force imparted to the cylinder 3. Because the lower end of the tube 20 is closed by the plug member 35, fluid pressure in the valve housing 14 and in the bore 15 tends to blow the tube 20 out with a force equal to the fluid pressure times the area of the fluid seal 23. However, such blow out of the tube is prevented by the interengagement of the tube collar 27 and the retaining flange 28 which is secured to the valve housing 14 by the screws 29. However, because the lower end of the tube 20 is closed and balanced, there is no eccentric loading of the cylinder head assembly 4 which would tend to tilt the cylinder assembly 4 and to impose uneven stresses in the bolts 42.

Assembly may be accomplished in any of several different ways. For example, with the retaining flange 28 detached from the valve housing 14, the lower end of the tube 20 may be positioned in the bore 16 of the cylinder 3 and then the cylinder head assembly 4 may be lowered into place and the several bolts 42 tightened to securely fasten it to the upper end of the cylinder 3. After that has been done, the tube 20 may be raised to position its upper end in the bore 15 of the valve housing 14 whereafter the retainer flange 28 is secured in place by the screws 29. Another way of assembling would be to have the tube 20 secured to the valve housing 14 and as the cylinder head assembly 4 is lowered into place, the lower end of the tube 20 may be positioned in the bore 16 whereafter the cylinder head assembly 4 may be turned or shifted laterally to align the bolt holes thereof with the threaded holes in the upper end of the cylinder 3.

As is well known in the manufacturing arts, assemblies comprising a number of parts cannot, without extremely high cost, be manufactured to exact dimensions and therefore when the cylinder head assembly 4 is secured to the upper end of the cylinder 3, the bores 15 and 16 may be misaligned due to tolerance variations. Generally, it is no problem to make the bores 15 and 16 with their axes perpendicular to the mating locating faces of the cylinder head assembly 4 and the upper end of the cylinder 3. However, due to tolerance variations, the axes of the bores may be circumferentially or radially offset with respect to each other and in either case, the tube assembly 1 herein permits ready assembly taking into account any such slight misalignment while yet providing an effective fluid seal while maintaining the usual slight clearances which are required in high pressure installations to prevent leakage and to prevent extrusion of rubber-like packing rings.

I, therefore, particularly point out and distinctly claim as my invention:

1. A pressure balanced tube assembly comprising a tube having a closed end portion with an adjacent opening through the wall thereof and an open end portion; a first coupling member with which said open end portion has sealed engagement; said first coupling member and tube having radially overlapped surfaces to axially retain said first coupling member and tube together against relative axial movement under the influence of fluid pressure therein; a second coupling member having a bore in which said closed end portion is telescopically received and sealed therein on opposite sides of said opening to render fluid pressure ineffective to tend to impose an axial thrust load between said tube and said second coupling member; said assembly being thus pressure balanced so that fluid under pressure in said assembly is ineffective to tend to relatively axially move said first and second coupling members with respect to each other; said end portions being tiltable with respect to said first and second coupling members to accommodate variation in the relative lateral positions of said coupling members with respect to each other.

2. The assembly of claim 1 wherein said closed end position is jointed to permit tilting of said tube in said bore.

3. The assembly of claim 1 wherein said closed end portion is jointed to provide a plug member sealed in said bore on the side of said opening remote from said first coupling member; said tube and plug member having radially overlapped surfaces having radial clearance with each other and with said bore whereby said tube where sealed in said bore on the other side of said opening may tilt with respect to said plug member and said second coupling member.

4. A tube coupling assembly comprising tube and coupling members having axially interfitting end portions defining an annular chamber therebetween; a packing ring radially squeezed in said chamber to provide a fluid tight joint between said tube and coupling members; said members having different radial clearances on axially opposite sides of said chamber with the smaller clearance preventing extrusion of said packing ring under the influence of fluid pressure in said assembly and with the larger clearance permitting relative tilting of said members without permitting fluid leakage past said packing ring or extrusion of said packing ring.

5. The assembly of claim 4 wherein said tube and coupling members have radially overlapped surfaces to retain said members axially together against separation under the influence of fluid pressure in said assembly.

6. The assembly of claim 4 wherein said portion of said tube member is telescopically interfitted in a bore in said coupling member and has an annular groove which defines said annular chamber with said bore; and wherein said end portion of said tube member has different diameters on axially opposite sides of said groove to define such different radial clearances with the bore of said coupling member.

7. The assembly of claim 4 wherein said tube member has a closed terminal end portion which has a loose pivotal connection with said end portion thereof for tilting of said tube member with respect to said closed terminal end portion; and wherein another packing ring is disposed between said coupling member and said closed terminal end portion.

8. The assembly of claim 7 wherein said tube member has a lateral opening through the wall thereof between said packing rings to permit flow of fluid through said assembly while rendering fluid pressure ineffective to tend to axially separate said members.

9. A tube coupling assembly comprising a tube member having end portions; a coupling member axially interfitting each said end portion and defining an annular chamber therewith; packing rings radially squeezed in said chambers to provide fluid tight joints between said tube end portions and said coupling members; said end portions having different radial clearances with the respective coupling members on axially opposite sides of the respective chambers with the smaller clearances preventing extrusion of said packing rings under the influence of fluid pressure in said assembly, and with the larger clearances permitting relative tilting of said tube member with respect to said coupling members to accommodate variation in the relative angular or lateral positions of said coupling members but without permitting fluid leakage past said packing rings or extrusion of said packing rings.

10. The assembly of claim 9 wherein one of said tube end portions and the respective coupling member have radially overlapped surfaces to retain them axially together against separation under the influence of fluid pressure in said assembly.

11. The assembly of claim 9 wherein said tube end portions are telescopically interfitted in bores in said coupling members and have annular grooves which define said annular chambers with said bores; and wherein said tube end portions have different diameters on axially opposite sides of said grooves to define such different radial clearances with the bores of said coupling members.

12. The assembly of claim 11 wherein one tube end portion terminates in a closed terminal end portion which is sealed in the bore of the respective coupling member and which has a loose pivotal connection with said tube member to permit such tilting of the latter.

13. In a fluid motor of the type wherein fluid is conducted into and from one end of the cylinder thereof through a transfer tube which extends alongside said cylinder from such one end thereof toward the other end, and which has end portions telescopically interfitting in and sealed in axially spaced apart bores of said cylinder, at least one of which bores is contained in a detachable cylinder head, the improvement which comprises a transfer tube having an open end portion sealed in the surrounding bore, and a closed end portion with an adjacent lateral opening through the wall thereof, said closed end portion being sealed in the surrounding bore on axially opposite sides of said opening; and retaining means adjacent said open end portion to axially retain said tube in the bore surrounding said open end portion whereby fluid pressure in said bores and transfer tube is ineffective to impose an eccentric load tending to relatively tilt said cylinder and cylinder head; said end portions being tiltably sealed in said bores to accommodate variation in the lateral positions of said bores with respect to each other.

14. A pressure balanced tube assembly comprising a tube having a closed end portion with an adjacent opening through the wall thereof and an open end portion; a first coupling member with which said open end portion has sealed engagement; said first coupling member and tube having radially overlapped surfaces to axially retain said first coupling member and tube together against relative axial movement under the influence of fluid pressure therein; a second coupling member having a bore in which said closed end portion is telescopically received and sealed therein on opposite sides of said opening to render fluid pressure ineffective to tend to impose an axial thrust load between said tube and said second coupling member; said assembly being thus pressure balanced so that fluid under pressure in said assembly is ineffective to tend to relatively axially move said first and second coupling members with respect to each other; said open end portion being telescopically received in a bore in said first coupling member and defining therewith an annular chamber; a packing ring radially squeezed in said chamber to provide a fluid tight joint between said open end portion and said first coupling member; said closed end portion defining with the bore of said second coupling member a pair of annular chambers straddling said opening; a packing ring radially squeezed in each one of said pair of chambers to provide a fluid tight joint between said closed end portion and said second coupling member on opposite sides of said opening; said open end portion and the bore of said first coupling member having different radial clearances on opposite sides of said chamber; said closed end portion and said second coupling member having different radial clearances on opposite sides of the one of said pair of chambers nearest said open end portion; said tube having a closed terminal end portion which is loosely pivotally connected to said tube and which defines the other one of said pair of chambers; the smaller clearances preventing extrusion of the adjacent packing rings under the influence of fluid pressure in said assembly and the larger clearances permitting tilting of said tube in the respective bores with respect to said first coupling member and with respect to said second coupling member and said terminal end portion.

15. In a fluid motor of the type wherein fluid is conducted into and from one end of the cylinder thereof through a transfer tube which extends alongside said cylinder from such one end thereof toward the other end, and which has end portions telescopically interfitting in and sealed in axially spaced apart bores of said cylinder, at least one of which bores is contained in a detachable cylinder head, the improvement which comprises a transfer tube having an open end portion sealed in the surrounding bore, and a closed end portion with an adjacent lateral opening through the wall thereof, said closed end portion being sealed in the surrounding bore on axially opposite sides of said opening; and retaining means adjacent said open end portion to axially retain said tube in the bore surrounding said open end portion whereby fluid pressure in said bores and transfer tube is ineffective to impose an eccentric load tending to relatively tilt said cylinder and cylinder head; said closed end portion comprising a terminal plug member which is loosely pivotally connected to said tube and which is sealed in the surrounding bore on one side of such opening, the adjoining portion of said tube being sealed in said bore on the opposite side of such opening; said adjoining portion and said open end portion and said retaining means permitting tilting of the tube in the surrounding bore to accommodate variation in the lateral positions of said bores with respect to each other when said cylinder head is secured to said cylinder.

* * * * *